INVENTOR
STANLEY R. HATCHER
JOHN BOULTON
BY
Harold A. Weir
PATENT AGENT

United States Patent Office 3,508,861
Patented Apr. 28, 1970

3,508,861
PROTECTION OF ZIRCONIUM ALLOYS AGAINST HYDRIDING IN ORGANIC COOLANTS
Stanley R. Hatcher and John Boulton, Pinawa, Manitoba, Canada, assignors to Atomic Energy of Canada Limited, Ottawa, Ontario, Canada, a corporation of Canada
Filed Sept. 2, 1965, Ser. No. 484,594
Int. Cl. C23f 11/08
U.S. Cl. 21—2.7          2 Claims

ABSTRACT OF THE DISCLOSURE

A method for reducing the accelerated hydriding of zirconium alloys exposed to organic coolant contaminated with chlorine by maintaining a concentration of at least 60 p.p.m. of water in the coolant.

---

This invention relates to a method for reducing the amount of hydriding occurring in zirconium alloys when immersed in certain organic fluids. In particular, the method of this invention is useful in protecting zirconium alloy components from excessive hydriding when used in nuclear reactors having organic coolants.

Zirconium and its alloys are desirable materials for use in nuclear reactors due to their low value of neutron capture cross-section. This desirable property leads to efficient and economical power reactor systems. Such materials normally have adequate strength and ductility for use at temperatures in the vicinity of 500° C. Zirconium, however, has an affinity for hydrogen and is capable of absorbing a sufficient amount of hydrogen to form hydrides. The consequent precipitation of zirconium hydride in a zirconium alloy component has a deleterious effect on the mechanical properties of the component and may, in time, lead to serious embrittlement if the absorption of hydrogen is not controlled. Clearly, this limitation in the useful life of the component is undesirable.

Nuclear reactors using organic coolants are presently contemplated. One type of such organic coolant is Santowax OM, which is a brand name of the Monsanto Company denoting a mixture of terphenyls. Santowax OM has a freezing point of 38° C. and below that temperature is a yellow crystalline solid, soluble in benzene, acetone and ethanol but insoluble in water. A further type of organic coolant is denoted as HB-40, also a brand name of the Monsanto Company. HB-40 consists of a mixture of partially hydrogenated terphenyls. Both these organic coolants produce hydrogen by thermal decomposition, HB-40 having a higher rate of hydrogen production than Santowax OM. In this specification the phase "organic coolant" is used to denote Santowax OM, HB-40 and their chemical equivalents.

When zirconium alloy components are exposed to organic coolants it is found that excessive amounts of hydrogen are absorbed. This is due to the fact that the organic coolant constitutes a medium which has no oxidizing potential and, in addition, contains hydrogen produced by thermal decomposition. It is also found that by preforming an oxide film on the zirconium alloy component the rate of hydriding can be somewhat reduced.

It has also been found that the present of chlorine in organic coolant greatly increases the rate of hydriding of zirconium alloys exposed to the coolant despite the presence of an oxide film on the zirconium alloy. The addition of 50 p.p.m. of chlorine to an organic coolant has been found to result in an increase in the rate of hydriding of up to 200 times. While applicants do not claim to provide a complete explanation of this effect, it appears that the chlorine is absorbed in the thin film of oxide surrounding the zirconium alloy in such a manner as to render it more porous to hydrogen.

It is, therefore, an object of this invention to provide a method for reducing the hydriding of zirconium alloys when exposed to an organic coolant.

It is a further object of this invention to provide a method for reducing the hydriding of zirconium alloys when exposed to an organic coolant contaminated with chlorine.

Applicants have found that by providing and maintaining a certain concentration of water in the organic coolant, the hydriding of zirconium alloys exposed to such coolant is greatly reduced. In the case of organic coolant which is not contaminated with chlorine it is found that a water concentration exceeding 50 p.p.m. is sufficient to form and maintain a zirconium oxide film covering the zirconium alloy. This is confirmed by the fact that in using such a coolant the effect of pre-forming an oxide film on the zirconium alloy component is less marked than when using a coolant of low water content. Scratching the zirconium alloy has little effect on the hydriding rate since the oxidizing potential of the water in the coolant is sufficient to reform the oxide film over the scratched portion. Because of the presence of the oxide film the hydrogen absorbed by the zirconium alloy comes only from that produced by the oxidizing process and the hydriding rate is independent of the concentration of hydrogen in the coolant.

In the case of an organic coolant contaminated by chlorine, applicants have found that by providing and maintaining a concentration of water in the coolant greater than 60 p.p.m., the hydriding of zirconium alloys exposed to such coolant is greatly reduced. It appears that two desirable effects arise from maintaining the stated water concentration in the coolant. The first is the formation and maintenance of an oxide film on the zirconium alloy, as described in the immediately preceding paragraph. The second effect is found in a reduction of the capacity of the oxide film for chlorine absorption. While the exact mechanism of this latter effect is uncertain, it is thought to be attributable to an ion exchange mechanism.

Further objects and features of this invention will become apparent from the following description taken in conjunction with the accompanying drawings in which.

Figure 1:
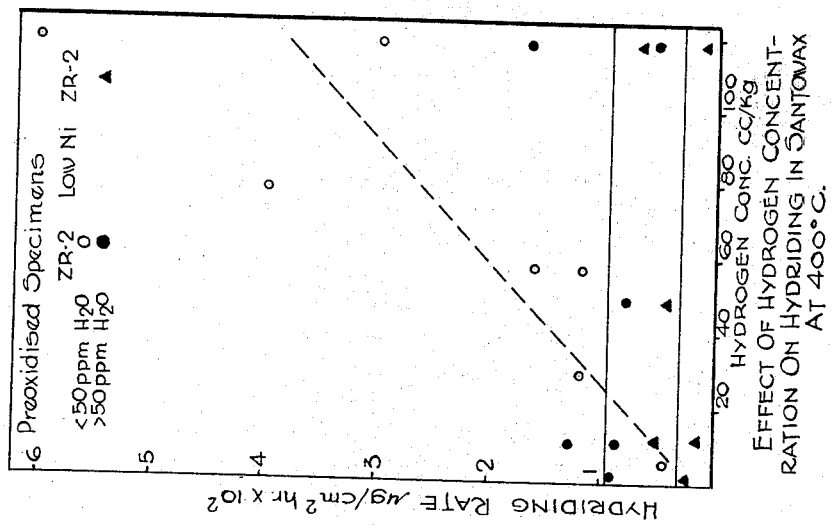
FIGURE 1 is a graph showing the rate of hydriding of zirconium alloys when exposed to organic coolant having varying concentrations of hydrogen and water.

In autoclave tests with organic coolant it was found that the absorption of hydrogen depended both on the concentration of water in the coolant and on the condition of the surface of the zirconium alloy test sample. When the water concentration in the coolant was less than 50 p.p.m. pickled samples (i.e., those with clean metal surfaces) absorbed large amounts of hydrogen. Samples having a pre-formed oxide layer of thickness 1 μm. gave lower rates of hydrogen absorption. The rate of hydrogen absorption varied linearly with the concentration of dissolved hydrogen in the organic coolant.

When the water concentration in the organic coolant was maintained at a level greater than 50 p.p.m. the isolating valve 15, a high temperature test section 18, a specimen holder 19 and a further isolating valve 17.

Surge tank 11 has a pair of conduits 12 and 13 connected with it for the purpose of venting the tank and providing a controlled atmosphere for varying the amount of water in the coolant. A sampling valve 20 is provided in conduit 23 for extracting samples of the coolant for analysis.

TABLE I.—SUMMARY OF HYDRIDING RATES [1] IN SHORT TERM TESTS IN SANTOWAX OM

| Alloy | Surface condition | 365° C. <50 p.p.m. $H_2O$ | 400° C. <50 p.p.m. $H_2O$ | 400° C. >50 p.p.m. $H_2O$ | 425° C. <50 p.p.m. $H_2O$ | 425° C. >50 p.p.m. $H_2O$ |
|---|---|---|---|---|---|---|
| Zircaloy-2 | Pickled | ~0.2 | 0.05->40 | 0.01-0.05 | 0.1-10 | ~0.1 |
|  | Preoxidized [2] | ~0.02 | 0.01-0.06 | 0.005-0.02 | 0.02 | 0.02 |
| Low Nizircaloy-2 | Pickled | ~0.2 | 0.4->30 | 0.01-0.03 | 2.7 | 0.04-0.3 |
|  | Preoxidized [2] | ~0.002 | 0.001-0.01 | 0.001-0.006 | 0.002-0.01 | 0.003-0.008 |
| Zr-2-½% Nb | Pickled | ~1 | 2.8->35 | 0.01-0.03 | 16->25 | 1-1.7 |
|  | Preoxidized [3] | ~0.008 | 0.008-0.022 | 0.001-0.003 | ~0.006 | ~0.002 |

[1] Rates in μg./cm.² hr.
[2] 48 hrs. in air at 400° C. 1 μm. film.
[3] 5 hrs. in air at 400° C. 1 μm. film.

hydriding rate of the pickled samples decreased by at least one order of magnitude. The hydriding rate of the samples having a pre-formed oxide layer did not change by so great an amount. The rate of hydrogen absorption for both types of samples was independent of the concentration of dissolved hydrogen in the organic coolant.

In circulating loop tests made with organic coolant contaminated with chlorine it was found that the amount of hydrogen absorbed by zirconium alloys was greater than that expected from use of the organic coolant alone. When water was added and maintained at a concentration greater than 60 p.p.m. the amount of hydrogen absorbed dropped by over an order of magnitude. The absorption of hydrogen by the zirconium alloy was found to be approximately linearly proportional to the absorption of chlorine.

The following examples are illustrative of the method of this invention in reducing the hydriding of zirconium alloys by maintaining an adequate water concentration in organic coolants.

EXAMPLE 1

Samples of zirconium alloys were placed in organic coolant in an autoclave for durations of no more than three hundred hours. The majority of tests were carried out at 400° C., some were carried out at 365° C. and 425° C. The coolant used in the autoclave was Santowax OM and an imprecise control of the water and hydrogen content of this coolant was obtained, by adjusting the water vapour and hydrogen content of the nitrogen pressurizing gas in the autoclave. The results of these tests, relating the hydriding rate of zirconium alloy samples to water concentration in the coolant are shown in Table I. Further results, relating hydriding rate to hydrogen concentration in the coolant are shown in FIGURE 1.

It was found that by maintaining the concentration of water in the coolant at a level greater than 50 p.p.m., the hydriding rate in pickled samples was greatly reduced. This is apparent from Table I. It was also found that by maintaining this concentration of water in the coolant the hydriding rate of all samples was independent of the hydrogen concentration in the coolant. This is apparent, for preoxidized samples, from FIGURE 1.

EXAMPLE 2

Figure 2:
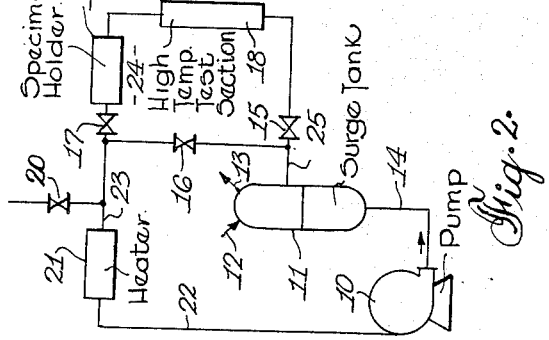
FIGURE 2 is a schematic diagram of a circulating coolant loop for testing the method of this invention.

To obtain more accurate control over the coolant composition, and hence more precise measurements, the circulating coolant loop of FIGURE 2 was set up. In this loop, constructed mainly of stainless steel, a pump 10 is connected to a surge tank 11 by a conduit 14. An outlet conduit 25 from the surge tank is connected through a by-pass valve 16 to a return conduit 23. Conduit 23, in turn, is connected back to the pump via a heater 21 and a conduit 22. Shunted across by-pass valve 16 is a test section 24 consisting of a cascade arrangement of an As a preliminary to each experiment the loop was washed with xylene, pickled with hot 1 molar nitric acid, washed with water and dried. The loop was the filled with approximately 1.5 kg. of organic coolant and the heater and pump adjusted to circulate the coolant at 400° C. and 525 p.s.i.g. The water content of the coolant could be adjusted to any desired range by passing a stream of controlled humidity nitrogen, via conduits 12 and 13, through the coolant maintained at operating temperature and pressure.

A series of tests, each of 48 hours' duration, was conducted with chlorine added to the coolant in an amount to give a nominal chlorine concentration of 10 p.p.m. The chlorine addition was effected by using one of trichloroethylene, chlorobiphenyl and hydrochloric acid. The coolant was circulated to promote complete mixing and samples taken, via sampling valve 20, to determine the chlorine and water content of the coolant.

Flat strip specimens of zirconium alloy were installed in specimen holder 19 and a zirconium alloy test wire was installed in the high temperature test section. The test wire was connected to a source of electrical power. Isolating valves 15 and 17 were then opened and by-pass valve 16 closed to allow the coolant containing water and chlorine to flow through test section 24. Electrical power was supplied to the test wire to maintain it at a surface temperature of 480° C. and further samples of the coolant taken via valve 20 to determine chlorine and water concentrations.

The contaminated coolant was then circulated past the zirconium alloy specimens for 48 hours. At the end of this period, the coolant was again sampled to determine chlorine and water concentrations and the specimens removed for analysis to determine the amount of hydrogen and chlorine absorbed.

Figure 3:
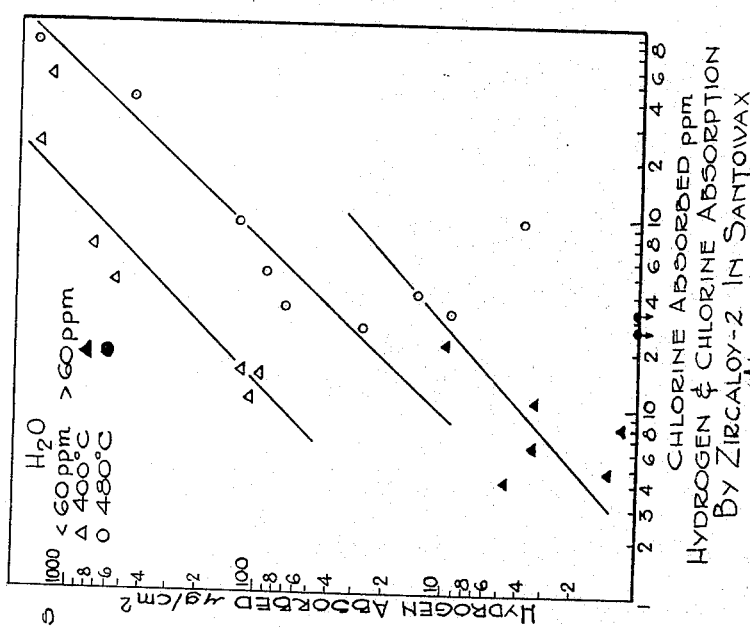
FIGURE 3 is a graph, showing the amounts of hydrogen and chlorine absorbed by zirconium alloys from coolant contaminated with 10 p.p.m. chlorine, obtained with the testing loop of FIGURE 2.

The results of these tests, relating the hydrogen and chlorine absorbed to the concentration of water in the coolant, are shown in FIGURE 3. It was found that the absorption of hydrogen was approximately linearly proportional to the absorption of chlorine. A significant reduction in the amount of hydrogen absorbed was found when the water concentration exceeded 60 p.p.m.

While it has been shown that the method of this invention gives beneficial results when the concentration of water in uncontaminated coolant is maintained greater than 50 p.p.m. and the concentration of water in chlorine contaminated coolant is maintained greater than 60 p.p.m. it is desirable to maintain the concentration of water in the coolant at 100 p.p.m. as a safeguard against the accidental occurrence of a low concentration of water. It is not necessary to maintain the water concentration at any level higher than 500 p.p.m.

We claim:
1. A method for reducing the hydriding of zirconium alloy components exposed to organic coolants contami- nated with chlorine comprising the steps of adding water to said contaminated organic coolant, exposing said zirconium alloy component to said aqueously modified coolant to form thereon an oxide film of a thickness sufficient to retard hydriding of said component, and maintaining the concentration of water in said contaminated organic coolant greater than 60 p.p.m. and less than 500 p.p.m. to maintain said film on said component.

2. A method as claimed in claim 1, wherein the concentration of water in said contaminated organic coolant is maintained at 100 p.p.m.

References Cited

V. H. Troutner, Corrosion, 16, 281t–283t (1960).

MORRIS O. WOLK, Primary Examiner

S. MARANTZ, Assistant Examiner

U.S. Cl. X.R.

176—38